United States Patent Office 2,765,913
Patented Oct. 9, 1956

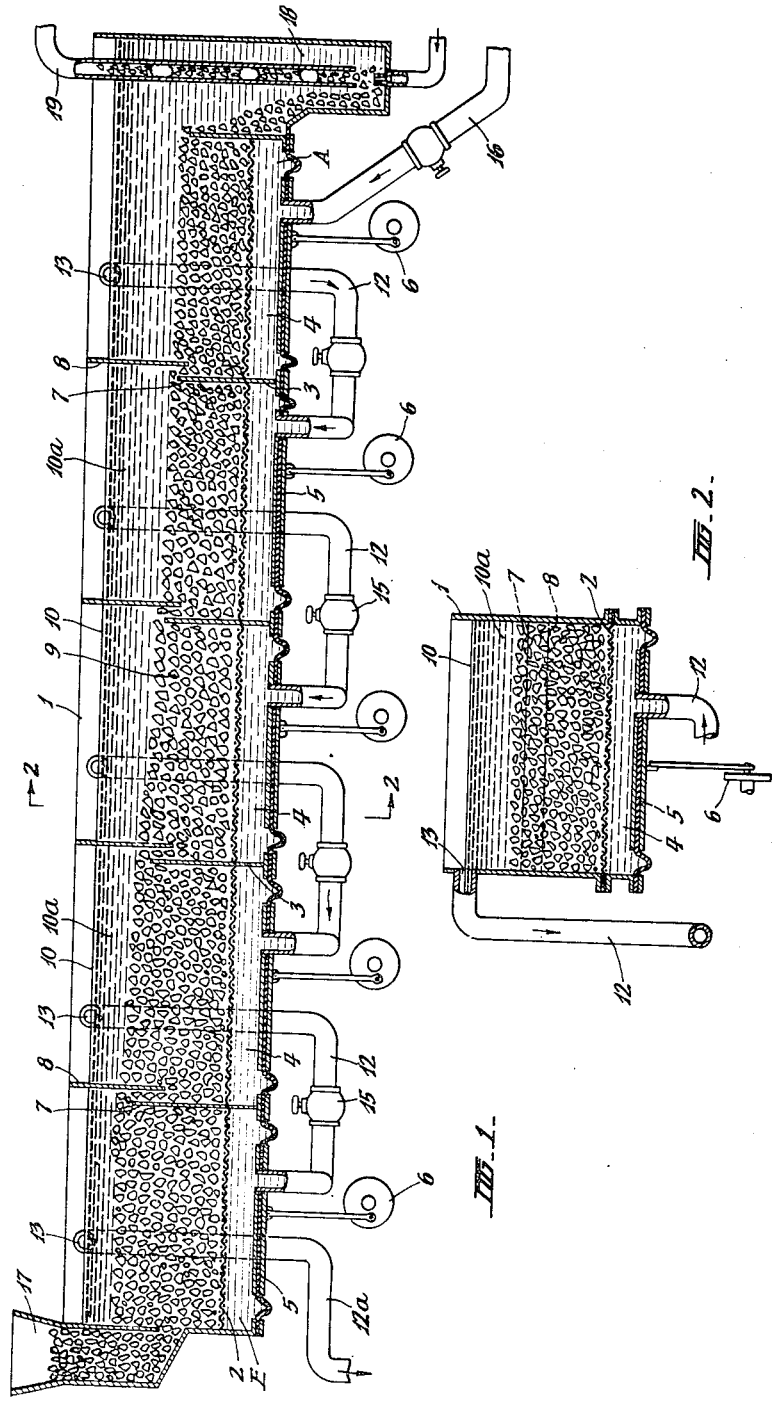

2,765,913

METHOD OF AND APPARATUS FOR OBTAINING CONTINUOUS COUNTERCURRENT CONTACT BETWEEN SOLID PARTICLES AND A LIQUID

Donald Eric Weiss, Blackburn, Victoria, and Everard Arthur Swinton, Watts Parade, Mount Eliza, Victoria, Australia, assignors to Commonwealth Scientific and Industrial Research Organization, East Melbourne, Victoria, Australia, a body corporate Application October 20, 1954, Serial No. 463,438

Claims priority, application Union of South Africa October 22, 1953

4 Claims. (Cl. 210—42.5)

This invention relates to an improved method of and apparatus for obtaining continuous countercurrent contact between solid particles and a liquid.

Various means have been employed to bring solid particles and liquids into effective contact.

The simplest procedure for obtaining countercurrent flow is to provide means which allow solid particles to fall freely through a rising column of liquid but the turbulence created by the falling particles creates backmixing which tends to counteract the countercurrent action, and adequate contact times can only be obtained by the use of excessively long columns. With a view to overcoming these difficulties various moving bed techniques have been devised. One such moving bed countercurrent system employs a vertical tower containing a compact bed of granular solids which are permitted to flow as a compact mass down the column against a rising liquid stream. Although this technique is satisfactory for use in towers of small cross-sectional area, considerable difficulties occur when larger towers are employed since it is difficult to withdraw the solids uniformly over the whole cross-sectional area of the bottom of the tower, and this results in non-uniform solid movement throughout the tower. If finely divided particles are being treated channeling often occurs with the result that the liquid flow is uneven.

The fluidised solids technique has been proposed for obtaining such countercurrent flow. This technique is based on the fact that when a solid of suitable particle size is added to a liquid stream which is flowing upwards at a velocity less than the free settling rate of the solids a fluidised solids phase is formed. Since this phase is turbulent and can be handled as a liquid the movement of the solids is thus simplified. A number of difficulties are associated with this type of operation, particularly if it is used to obtain countercurrent contact between an adsorbent and a liquid phase where sufficient contact time must be allowed for adsorption to occur. The contact time is limited by the high liquid flow velocity necessary to maintain fluidised conditions. Thus only very short contact times can be obtained unless recirculating pumps are used to recycle the liquid between each stage. This is undesirable because of the expense involved and is inefficient since considerable liquid shortcircuiting between the circulating streams tends to occur. Also, because of the highly turbulent condition in the fluidised solids phase a certain amount of solid shortcircuiting occurs whereby some particles spend considerably less than the average time in effective contact with the liquid. This results in inefficiencies. Attrition losses due to particle breakdown are considerable because of the highly turbulent nature of the fluidised particles bed.

Another type of fluid bed operation has been used for many years in ore dressing where it is well known that if a pulsating stream of water is passed up through a mixture of ground minerals of different specific gravities the minerals segregate into layers according to their specific gravities, the heaviest being at the bottom. Unlike the completely fluidised and turbulent systems described above, the use of a pulsating liquid stream within a certain range of flow velocities produces a non-turbulent bed which is expanded sufficiently to allow a film of liquid to separate the individual mineral particles, thus reducing the inter-particle friction and permitting the bed of particles to flow as a fluid. This phenomenon has permitted minerals of different specific gravities to be separated by a process termed "jigging." It has often been the practice to employ a number of jigs in series so that the bed of minerals flows consecutively from jig to jig, each individual jig being provided with its own mechanism for pulsating the water which fluidises the particles. However the pulsating water from each compartment meets in a common space above the perforated screens, which retain the mineral bed, and leaves by a common overflow.

We have recently employed the principle of obtaining a non-turbulent bed of solids by fluidisation with a pulsating liquid stream to obtain countercurrent contact between a moving bed of adsorbent particles and a liquid. Two forms of apparatus invented by us for this purpose have recently been described in the Australian Journal of Applied Science, volume 4, Number 2, pages 316–328, 1953.

In one of said forms of contacting apparatus a pulsating stream of liquid flows up through a series of perforated plates arranged in a vertical cascade with downcomers such that a bed of solid particles, retained by the plates and rendered mobile by the pulsating liquid, consecutively traverses each plate and descends countercurrently to the liquid stream. There are several undesirable features inherent in this apparatus. It is not a simple matter to replace the perforated plates and this defect is of particular importance if it is desired to contact the particles with a slurry, when screen blockage very often occurs. Further, only one pulsation mechanism can be used and this must be strong enough to be able to fluidise all the beds of solids on each perforated plate. Nor is it a simple matter to fill and start the apparatus because it is first necessary to seal the downcomers with a bed of solid particles.

In the second of said forms of apparatus a bed of solids is fluidised above a perforated plate which moves in a fixed bath of liquid in a manner which causes the liquid to be pulsated and at the same time throws the bed of solid particles along the perforated plate. Liquid fed in at the end of the apparatus remote from that to which the solid particles are fed traverses the apparatus countercurrently to the bed of particles. A major limitation is that there is no positive flow device which ensures that all those particles are intimately contacted with the liquid in a countercurrent multi-stage fashion. This defect is particularly serious for deep beds of solid particles and limits the number of particles that can be effectively contacted in such an apparatus. A further limitation is that a number of such devices cannot be simply interconnected in series, it being necessary to provide a special transfer system to ensure that the solid particles pass from one unit to the next with the minimum amount of entrained liquid. The apparatus is therefore more suitable for small than for large scale operation.

These limitations have been removed in a new method of, and apparatus for, obtaining countercurrent contact between solid particles and a liquid which form the subject of this invention.

An object of this invention is to provide an apparatus and method whereby particles, provided that they are of sufficient size to be retained above a porous partition, may be positively and uniformly moved countercurrently to a liquid stream at a rate which can be adjusted independently of the net liquid flow rate throughout the apparatus and at a rate which can be adjusted independently of the sedimentation velocity of the particles.

Another object is to provide a continuous countercurrent contacting apparatus for solids and liquids which is suitable for large scale operation and which can be assembled by simple modification of standard ore dressing equipment.

Another object is to provide a continuous countercurrent contacting method and apparatus for solids and liquids which enable the relative velocity between the particles and the liquid to be adjusted independently of the net liquid flow throughout the apparatus.

Another object is to provide an apparatus and method which enable the addition or withdrawal of liquid or solid to be made simply and conveniently at as many points in the apparatus as are desired.

Another object is to provide an apparatus in which the bed of particles is readily accessible for purposes of inspection, cleaning or clearing.

Another object is to provide an apparatus which is not susceptible to blockages arising from the presence of colloidal or finely divided suspended matter in the liquid phase and which permits the countercurrent contact of granular particles of one solid with a slurry of other finely divided solids suspended in a liquid Another object is to provide a continuous countercurrent contacting apparatus and method for solids and liquids which enables simultaneous contact with liquid of two or more different solid species differing in their sedimentation velocities and which enable the particles to be withdrawn as separate streams after such liquid contact.

Another object of this invention is to provide an apparatus and method whereby ion-exchange resin particles, provided that they are of sufficient size to be retained above a porous partition, may be positively and uniformly moved countercurrently to a liquid stream at a rate which can be adjusted independently of the net liquid flow rate throughout the apparatus and at a rate which can be adjusted independently of the sedimentation velocity of the particles.

Another object is to provide a multi-stage process for the continuous countercurrent contacting of solids and liquids in the cases where the solid changes in density as it is contacted with the liquid and where the heavier (or lighter) solid is passed preferentially on to the next stage.

According to this invention, a method of obtaining continuous countercurrent contact between solid particles and liquid comprises feeding a particulate solid to one end portion of a contacting apparatus and feeding liquid countercurrently to said solid from the opposite end portion of such contacting apparatus, passing said solid along a series of perforated plates arranged at substantially the same level or offset from each other and pulsating said liquid so that at each pulsation, liquid passes through and returns through the perforations in said plates and thus intermittently produces completely or partly fluidised beds of solid particles adjacent to said plates, adjusting the magnitude of the pulsations to control the mobility of the particles and adjusting the overall liquid flow velocity to give the desired liquid contact time in the contacting apparatus, permitting the particles to flow at a controlled rate, removing the particles from the apparatus after countercurrent contact with the liquid, and removing the liquid which has passed countercurrently to the solids through the contacting apparatus.

Another feature of this invention resides in a method of obtaining continuous countercurrent contact between solid particles and liquid in the case where the particles have a density greater than that of the liquid to be contacted, which comprises feeding the particulate solid into an end compartment of a contacting apparatus provided with a series of contacting compartments formed by a train of perforated horizontal or gently sloping plates each having one or more transverse baffles to partially separate the adjacent contacting compartments, which extend upwardly into a contacting compartment to provide a weir which controls the level of the solids in that contacting compartment, feeding a liquid into a compartment remote from the compartment into which the particulate solid is fed, pulsating the liquid in each compartment so that the bed of particles lying on each perforated plate is completely or partly fluidised on the upward pulsation and is completely or partly settled on the downward pulsation and so that the movement of the particles at each pulsation is thereby restricted to a limited extent dependent on the magnitude of the pulsation, adjusting the magnitude of the pulsation to control the mobility of the particles and adjusting the overall liquid flow velocity to give the desired liquid contact time in the contacting apparatus, permitting the particles to flow consecutively from contacting compartment to contacting compartment at a rate equal to the rate at which the particles are fed to the apparatus, this rate being less than the maximum rate at which particles can flow freely over the weir in each contacting compartment, withdrawing the particles by suitable means from one or more contacting compartments, providing means to separate or partially separate the free liquid zone in one contacting compartment from the free liquid zone in an adjacent contacting compartment and means to transfer the liquid successively from one compartment to the next, and removing the liquid which has passed through the contacting apparatus countercurrently to the solids.

Still another feature of this invention resides in apparatus for obtaining continuous countercurrent contact between solid particles and liquid which comprises a series of lower compartments capable of holding liquid, a series of the same number of upper compartments separated from said lower compartments by an intermediate compartment common to and communicating with said upper and lower compartments, perforated screens capable of retaining the solid particles to be used and positioned between said common intermediate compartment, on the one hand, and said series of upper compartments, or said series of lower compartments, or said series of upper and said series of lower compartments, on the other hand, means for feeding liquid to one end compartment, means for withdrawing liquid at one or more points remote from said end compartment, means for feeding solid particles into said common intermediate compartment at the end remote from said end compartment, means for withdrawing solid particles at one or more points remote from the end into which the solid particles are fed, and means for pulsating liquid in said lower compartments so that it is evenly distributed through said screens, each of said upper compartments being superposed over a corresponding one of said lower compartments so that it registers or approximately registers therewith. To increase the efficiency of the apparatus, transverse baffles may be incorporated in the intermediate compartment to control the flow of liquid and solid therein.

The term "liquid" is used herein to include not merely a clear liquid but also a suspension of solid particles sufficiently fine to pass freely through the perforations of the screens.

The term "perforated screens" is intended to include perforated plates or wire gauze.

The preferred form of apparatus in accordance with this invention, for countercurrently contacting with liquid, solid particles which are heavier than the liquid, will now be described with reference to the accompanying drawings, in which:

Figure 1 is a view through the apparatus in longitudinal cross-section, and

Figure 2 is a view through the apparatus in transverse cross-section taken on the line 2—2 in Figure 1.

A long rectangular vessel 1 open at the top is divided horizontally by a perforated screen 2 having smaller apertures than the solid particles to be contacted. Beneath the screen 2, the vessel is divided by transverse partitions 3 to form a series of lower compartments 4, each fitted and sealed at its base with a diaphragm 5 which can be reciprocated, as by the eccentrics 6.

Above the screen 2, the vessel is divided by transverse vertical partitions 7 which extend upwardly from the level of the perforated screen. Corresponding partitions 8 extend from the top of the vessel nearly down to the perforated screen 2, overlapping the partitions 7 but being spaced longitudinally from them, the whole system dividing the vessel above the perforated screen into a series of upper compartments which intercommunicate through labyrinths. The upper and lower compartments approximately register with each other to form a series of cells.

A bed of the solid particles 9 above the perforated screen 2, and immersed in the liquid 10, is retained in each upper compartment by the transverse partitions 7, leaving a zone of clear liquid 10a above the bed in each cell. Weir pipes 12 having inlet ports 13 provide paths for liquid communication between the upper compartment of one cell and the lower compartment of the next, the liquid passing in each case through non-return valves 15.

The liquid 10 is pulsated up and down through the bed by means of the diaphragm 5 in each cell. Fresh liquid is fed into the base of the first cell A through inlet pipe 16 and a corresponding amount of liquid is pumped from the supernatant zone of each cell into the base of the succeeding cell through the weir pipes 12, the liquid from the final cell E overflowing through the outlet weir pipe 12a.

Due to the influence of the pulsations, and of the rising liquid stream through each bed, each bed of solid particles is maintained in a condition of teeter, and will flow in much the same way as a layer of heavy viscous liquid. Thus, when fresh solid is fed into the cell E of the apparatus through a hopper 17, a corresponding amount of solid overflows each of the transverse partitions 7, flows down through the labyrinth, and under the partitions 8 into the succeeding cell. Solid from the first cell A will thus overflow the last transverse partition 7, and fall into a sump 18 from which it is elevated by an air lift 19 or other convenient means.

It is then delivered to a dewatering screen, from which the carrier liquid, and any make-up liquid, is recycled back to the sump. The vertical partitions 7 are progressively reduced in height from the solid inlet end of the apparatus to the outlet end to enable the flow of solid to take place.

The transfer of liquid from one cell to the next is performed by the action of the pulsating diaphragms. Because of the presence of the non-return valves 15 in the overflow weir pipes 12, a small suction head develops in each pipe, due to the imperfect ball-valve action of the bed of solid particles.

In an alternative arrangement, positive control over the intercell liquid transfer is obtained by using a simple bucket pump or other adjustable positive pump for each transfer. Then by pumping a slight excess over the overall liquid flow rate, the flow of solid through the inter cell labyrinth is assisted by a small flow of recycling liquid.

If an increase in liquid contact time in any cell is desired while retaining a minimum upward flow rate, then a proportion of the liquid may be recycled through the same cell.

A number of well known methods other than the use of a diaphragm may be used to pulsate the liquid; for example, valve mechanisms which periodically cut off the liquid flow, or pistons.

The liquid flow through the labyrinths may be reduced with advantage by maintaining a more densely packed bed in these regions. This is achieved by reducing the number of apertures in the perforated screen in these regions.

A number of subsidiary baffles may be placed within the bed so as to cause the particles to pass alternatively over and under the baffles thus stopping any particles from rapidly traversing the top of the bed. It is desirable that one weir-like baffle be placed near each of the main vertical baffles which separate the upper compartments.

In some cases it may be advantageous to use a continuous sloping screen or a number of screens arranged as a series of steps.

The maximum flow rate of liquid through the stages is limited to just less than that at which the bed of solids becomes completely fluidised and washed over the weirs. Normally it is desirable to work well below this value in a range of velocities which give a semi-fluidised non-turbulent bed. The maximum flow rate may be increased however by placing an upper screen a little above the minimum upper level of the bed, the mesh of this screen being such as to retain the bed of particles.

If solids lighter than the liquid are to be contacted an upper instead of a lower screen may be provided, beneath which the bed lies. In this case the walls of the lower compartments serve as the partitions which separate the liquid in each stage. A dual upper and lower screen may also be used.

The level of the bed of solids is most simply controlled by a weir but other means may be employed such as mechanically adding and withdrawing the solid particles at exactly the same rate, thus enabling a predetermined amount of solids to be retained in the apparatus.

It is also possible to employ the apparatus to contact a liquid countercurrently with a mixture of solid particles of different densities but of approximately the same size. In this case the bed will segregate into strata of the different solids, which may be removed separately at different levels.

It will be appreciated from the above description that the apparatus may be constructed from a standard multistage fixed sieve jig of the type used for ore dressing by adding the necessary baffles, launders, interstage pumps, pipe connections and fittings. It is thus possible to build an effective apparatus for the countercurrent contacting of liquid and solids by the simple modification of a well known machine normally intended for use for an entirely different purpose and operated in an entirely different manner.

The apparatus may be used, for example, in a continuous ion-exchange process for the recovery of a metal from a dilute solution, such as an effluent, or a leach solution. In this case the solution is passed through the apparatus countercurrently to a moving bed of ion-exchange resin particles, capable of preferentially extracting the desired constituent. After contacting the resin in a suitable number of compartments, the solution leaves the apparatus at a desired low concentration of the metal constituent. The resin, which becomes progressively loaded with the metal, finally flows from the apparatus, is washed and dewatered and passed countercurrently to an eluting solution in a second contacting device. The eluate containing the metal stripped from the resin leaves the apparatus as a product stream containing the metal constituent in a high concentration. The resin is then washed and returned to the first contacting device.

A typical example of a process of the above type is the removal and recovery of copper from the dilute effluent from a brass plating mill to render it suitable for discharge into a stream. The copper would be recovered as a concentrated copper sulphate solution.

A further example is in the continuous removal of undesirable ions from a water supply to render it suitable for various purposes such as boiler feed, laundry work, in chemical industry or domestic use.

In a practical example, 20 gallons per hour of a water containing 1000 parts per million of calcium bicarbonate was passed through a laboratory apparatus of the type shown in the drawings comprising four compartments each four inches square in screen area and each containing a bed three inches deep of sulphonated polystyrene ion-exchange resin beads marketed under the trademark "Amberlite I. R. 120" and ranging in size between 20 and 36 mesh. The screens comprised 50 mesh "Monel" wire and pulsations of ⅛ inch in amplitude were applied at the rate of 100 per minute. The liquid effluent was substantially free of calcium. The resin entered the apparatus substantially as the sodium form and left substantially as the calcium form at a rate of 600 grams per hour and was cycled through a second unit where it was regenerated to the sodium form by a countercurrent stream of sodium chloride brine. It was then washed free of brine and returned to the initial contacting apparatus.

Subsidiary features of the invention reside in some of the components of the preferred construction above-described; for example, in the diaphragm or piston and the non-return valves which are used for pumping in and pulsating the liquid, in the provision in some cases of a second screen in each compartment to retain the bed of solid particles, in the provision of subsidiary baffles, in adjusting the porosity of the screen in the neighbourhood of the main baffles and in the provision of pumps or like means for controlling the intercell liquid transfer. These subsidiary features are of considerable importance in practice as they achieve desirable results hereinbefore described.

We claim:

1. A method of countercurrently contacting solid adsorbent particles with a liquid in a contacting apparatus having a series of successively arranged compartments separated by transverse weir partitions and each provided with a substantially horizontal screen therein; said method comprising introducing the liquid to the contacting apparatus in the compartment at one end of the latter, withdrawing the liquid from the contacting apparatus at the compartment at the other end of the latter, introducing the solid adsorbent particles to said compartment at said other end of the apparatus at one side of the screen therein, withdrawing the solid adsorbent particles from the compartment at said one end of the apparatus so that the solid adsorbent particles spill past said weir partitions separating the series of compartments and travel through the latter from said other end to said one end of the contacting apparatus, vertically pulsating the liquid in said compartments so that, with each pulsation, liquid passes vertically to and fro through the screen of each compartment and produces a partly fluidized bed of the solid adsorbent particles adjacent the screen, constricting the flow of liquid horizontally past said weir partitions to avoid the introduction of a horizontal component in the pulsation of the liquid, and transferring, externally of the compartments, liquid from each compartment to the next adjacent compartment in the direction toward said other end of the contacting apparatus so that, while the liquid moves normal to the direction of movement of the solid adsorbent particles through the series of compartments, the overall movement of the liquid, from compartment to compartment through the contacting apparatus, is countercurrent to said direction of movement of the solid adsorbent particles.

2. Apparatus for obtaining continuous countercurrent contact between solid adsorbent particles and a liquid; said apparatus comprising a vessel, a series of substantially horizontal perforated screens arranged above the bottom of the vessel, a series of vertical weir partitions extending across said vessel between said screens so as to divide the vessel into a series of compartments, means for feeding solid adsorbent particles to one end of the vessel above said screens, means for removing solid adsorbent particles at the other end of the vessel, means for introducing liquid into the vessel at the end from which the solid particles are removed so as to completely submerge the solid particles in said liquid, means for removing liquid from the end of the vessel at which the solid particles are fed in, means transferring liquid externally of said vessel from the top of one compartment to the base of a compartment nearer to the liquid outlet end of the vessel, means pulsating the liquid in each compartment in a direction substantially normal to the perforated screen in that compartment so that the submerged bed of adsorbent particles in each compartment is alternately expanded and contracted during each pulse cycle, the vertical weir partitions being arranged to enable the flow of solid particles to take place across said screens and over said weir partitions from compartment to compartment along the length of the vessel, and means substantially preventing the horizontal flow of liquid past said weir partitions between the successive compartments so that the introduction of horizontal components in the pulsating flow of liquid in each compartment is avoided while the overall flow of liquid from compartment to compartment through the vessel by said external transferring means is counter-current to the flow of adsorbent particles through the vessel.

3. Apparatus for obtaining continuous counter-current contact between solid adsorbent particles and a liquid; said apparatus comprising a vessel, a series of substantially horizontal perforated screens arranged above the bottom of the vessel, means for feeding solid adsorbent particles to one end of the vessel above said screens, means for removing solid adsorbent particles at the other end of the vessel, means for introducing liquid into the vessel at the end from which the solid particles are removed so as to completely submerge the solid particles in said liquid, means for removing liquid from the end of the vessel at which the solid particles are fed in, a series of vertical partitions extending across said vessel between said screens so as to divide the vessel into a series of compartments, the said series of vertical partitions comprising a series of lower weir partitions extending upwardly from the bottom of said vessel to positions above said screens and a series of upper partitions offset from said lower weir partitions and extending downwardly from positions above the liquid level in said vessel to positions below the upper edges of the lower weir partitions, means transferring liquid externally of said vessel from the top of one compartment to the base of a compartment nearer to the liquid outlet end of the vessel, and means pulsating the liquid in each compartment in a direction substantially normal to the perforated screen in that compartment so that the submerged bed of adsorbent particles in each compartment is alternately expanded and contracted during each pulse cycle, the lower weir partitions being arranged to enable the flow of solid particles to take place across said screens and over said weir partitions from compartment to compartment along the length of the vessel, said upper partitions cooperating with said lower weir partitions and acting as baffles to substantially prevent the horizontal flow of liquid past said weir partitions between the successive compartments so that the introduction of horizontal components in the pulsating flow of liquid in each compartment is avoided while the overall flow of liquid from compartment to compartment through the vessel by said external transferring means is counter-current to the direction of movement of the adsorbent particles through the vessel.

4. Apparatus for obtaining continuous counter-current contact between solid adsorbent particles and a liquid as in claim 3; wherein the heights of said lower weir partitions progressively decrease from said one end of the vessel thereby to permit the flow of solid adsorbent particles from said one end to said other end of the vessel with a minimum variation in the heights of the beds of solid adsorbent particles in the several compartments.

References Cited in the file of this patent

UNITED STATES PATENTS

| | | |
|---|---|---|
| 1,133,110 | Dufourcq | Mar. 23, 1915 |
| 2,405,105 | Kennedy | July 30, 1946 |
| 2,528,099 | Wilcox et al. | Oct. 31, 1950 |

OTHER REFERENCES

Ser. No. 255,849, Suss (A. P. C.), published June 1, 1943.